United States Patent
Tanabe

(10) Patent No.: US 10,796,186 B2
(45) Date of Patent: Oct. 6, 2020

(54) PART RECOGNITION METHOD, INFORMATION PROCESSING APPARATUS, AND IMAGING CONTROL SYSTEM

(71) Applicant: FUJITSU LIMITED, Kawasaki-shi, Kanagawa (JP)

(72) Inventor: Satoshi Tanabe, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 279 days.

(21) Appl. No.: 16/008,089

(22) Filed: Jun. 14, 2018

(65) Prior Publication Data
US 2019/0005344 A1 Jan. 3, 2019

(30) Foreign Application Priority Data
Jul. 3, 2017 (JP) .................. 2017-130202

(51) Int. Cl.
G06K 9/32 (2006.01)
G06K 9/00 (2006.01)
G06T 7/73 (2017.01)
G06K 9/62 (2006.01)
G06K 9/46 (2006.01)

(52) U.S. Cl.
CPC ....... *G06K 9/3241* (2013.01); *G06K 9/00342* (2013.01); *G06K 9/00355* (2013.01); *G06K 9/00369* (2013.01); *G06K 9/4642* (2013.01); *G06K 9/6292* (2013.01); *G06T 7/73* (2017.01); *G06T 2207/30196* (2013.01)

(58) Field of Classification Search
CPC ............. G06K 9/3241; G06K 9/00342; G06K 9/00355; G06K 9/00369; G06K 9/4642; G06K 9/6292; G06T 7/73
See application file for complete search history.

(56) References Cited

U.S. PATENT DOCUMENTS

| 9,798,949 | B1 * | 10/2017 | Du ......................... G06K 9/46 |
| 2013/0301882 | A1 | 11/2013 | Kawaguchi et al. |
| 2014/0301605 | A1 | 10/2014 | Kawaguchi |
| 2018/0314908 | A1 * | 11/2018 | Lam ..................... G06K 9/6202 |

FOREIGN PATENT DOCUMENTS

| JP | 08-214289 | 8/1996 |
| JP | 2013-125402 | 6/2013 |
| WO | 2012/077287 | 6/2012 |

* cited by examiner

*Primary Examiner* — David F Dunphy
(74) *Attorney, Agent, or Firm* — Fujitsu Patent Center

(57) ABSTRACT

A part recognition method includes: cutting, by a computer, out a plurality of partial images having different sizes using each of positions of an input image as a reference; calculating a probability that each of the partial images is an image indicating a part; calculating, for each of the positions, a score by integrating the probability for each of the partial images; and recognizing, based on the score for each of the positions, the part from the input image.

7 Claims, 16 Drawing Sheets

P (LEFT HAND (x,y))

P (HEAD (x,y))

P (RIGHT HAND (x,y))

PART RECOGNITION METHOD, INFORMATION PROCESSING APPARATUS, AND IMAGING CONTROL SYSTEM

CROSS-REFERENCE TO RELATED APPLICATION

This application is based upon and claims the benefit of priority of the prior Japanese Patent Application No. 2017-130202, filed on Jul. 3, 2017, the entire contents of which are incorporated herein by reference.

FIELD

The embodiments discussed herein are related to a part recognition method, an information processing apparatus, and an imaging control system.

BACKGROUND

Parts included in an object are recognized from an image imaged by a camera.

Related technologies are disclosed in Japanese Laid-open Patent Publication Nos. H8-214289, 2013-125402, and International Publication Pamphlet No. WO 2012/077287.

SUMMARY

According to an aspect of the invention, a part recognition method includes: cutting, by a computer, out a plurality of partial images having different sizes using each of positions of an input image as a reference; calculating a probability that each of the partial images is an image indicating a part; calculating, for each of the positions, a score by integrating the probability for each of the partial images; and recognizing, based on the score for each of the positions, the part from the input image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
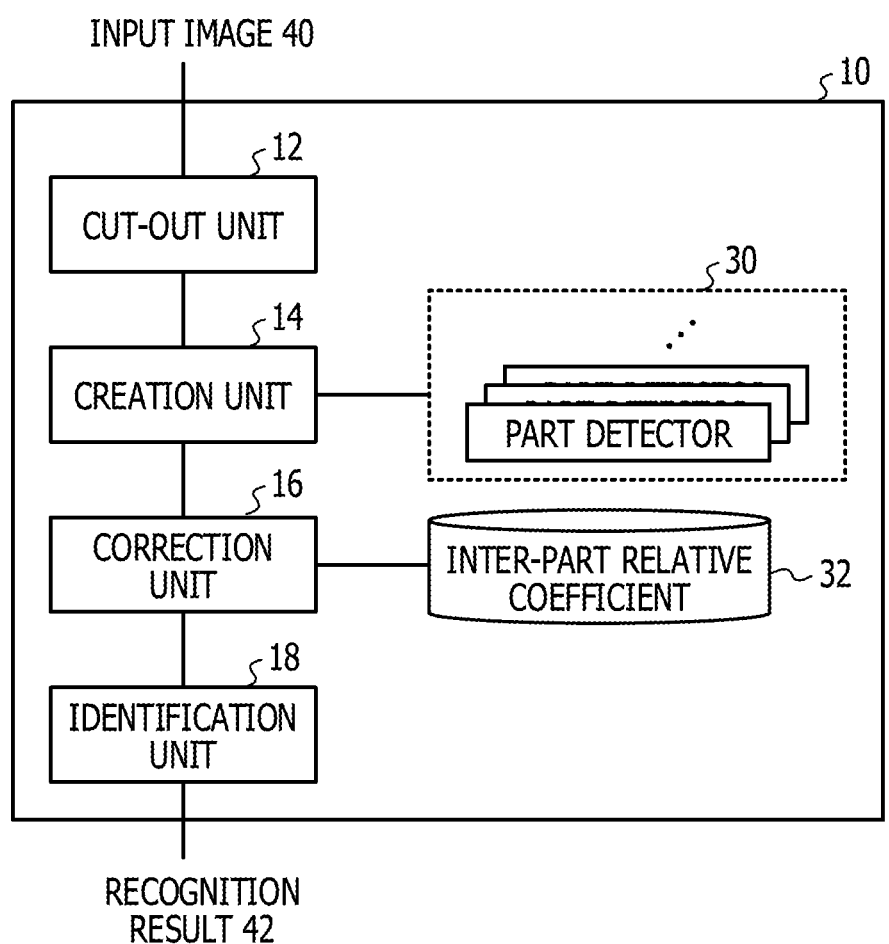
FIG. 1 illustrates one example of a function block of a part recognition apparatus.

For example, a time-series image analysis apparatus is provided with a buffer storage unit that stores a digital image signal as image data on a frame-by-frame basis, and a shape generation unit that extracts an object (moving image region) from the image data and generates a silhouette image. This apparatus is provided with an object model unit in which a model shape for representing the silhouette image as a geometric shape corresponded to each part of the object and information on a shape change due to a motion are stored. This apparatus is provided with a parameter calculation unit that conceptually calculates parameters of a position of a tilt angle of each part based on the outputs from the shape generation unit and the object model unit, a matching unit that causes the whole calculated parameter group to match a silhouette image group, and an output unit.

For example, a posture estimation apparatus is provided with an image input unit that acquires an image for which an object is photographed, and a posture information database that holds posture information defining arrangement of a plurality of parts for each posture. This apparatus is provided with a fitting unit that calculates a correlation degree for each part between the arrangement of the plurality of parts in the image and the posture information. This apparatus is provided with a difficulty level information table that holds an estimation difficulty level, which is a level of difficulty of estimation of a position of each part for each posture that is calculated based on a parallel line component of each part included in the posture information. In addition, this apparatus is provided with a posture estimation unit that applies weighting based on the estimation difficulty level with respect to a correlation degree, and performs estimation of the posture of the object based on the weighted correlation degree.

For example, a posture state estimation apparatus estimates a posture state of an object including joints with high accuracy. This apparatus is an apparatus that performs estimation of a posture state of the object based on image data in which an object including a plurality of parts coupled by joints is photographed. This apparatus is provided with a likelihood map generation unit that generates, from the image data, for at least two parts, a likelihood map indicating the distribution of plausibility of each part being positioned, and a learning likelihood map that is a likelihood map being associated in advance with the posture state. This apparatus is provided with a posture state estimation unit that estimates, when a coincidence degree between a learning likelihood map and an estimated likelihood map, which is a likelihood map generated based on the image data, is high, a posture state that is associated with the learning likelihood map, as a posture state of the object.

For example, when respective parts, such as a head, a right hand, and a left hand, with respect to an object such as a person, are recognized from an image that is imaged by a camera, a partial image having a predetermined size is cut out from the image, and using a part detector or the like, a probability that the partial image is an image indicating a target part is calculated.

However, when the extent of the size that the object is imaged in the image is indefinite, a redundant article such as a background is likely to be imaged into the cut-out partial image or a portion requested for recognition of the part is unlikely to be included. In this case, the recognition accuracy of the part may be lowered.

For example, a method or the like of recognizing a part from an image with good accuracy may be provided.

As illustrated in FIG. 1, a part recognition apparatus 10 receives a moving image that is imaged by a camera, for example, as an input image 40, for each frame, and outputs a recognition result 42 in which position coordinates of each part of an object in the input image 40 are identified. For example, the object may be a person, and each part set in advance, such as a head, a right hand, or a left hand, of a human body may be a part as a recognition target.

The part recognition apparatus 10 includes, as function units, a cut-out unit 12, a creation unit 14, a correction unit 16, and an identification unit 18. The creation unit 14 is one example of the calculation unit in the techniques of this disclosure. In a predetermined memory area of the part recognition apparatus 10, a plurality of part detectors 30 and an inter-part relative coefficient 32 are stored. The following describes the respective function units in details.

The cut-out unit 12 cuts out a plurality of patch images having different sizes using each position on the input image 40 as the reference. Note that, a patch image is one example of the partial image in the techniques of this disclosure. For example, the cut-out unit 12 cuts out, centering on each pixel (x, y) in the input image 40, regions having respective sizes (hereinafter, referred to as "size k") that are distinguished by a size number k (k=0, 1, 2, . . . , K (K−1 is the number of types of the size)), as patch images.

Figure 2:
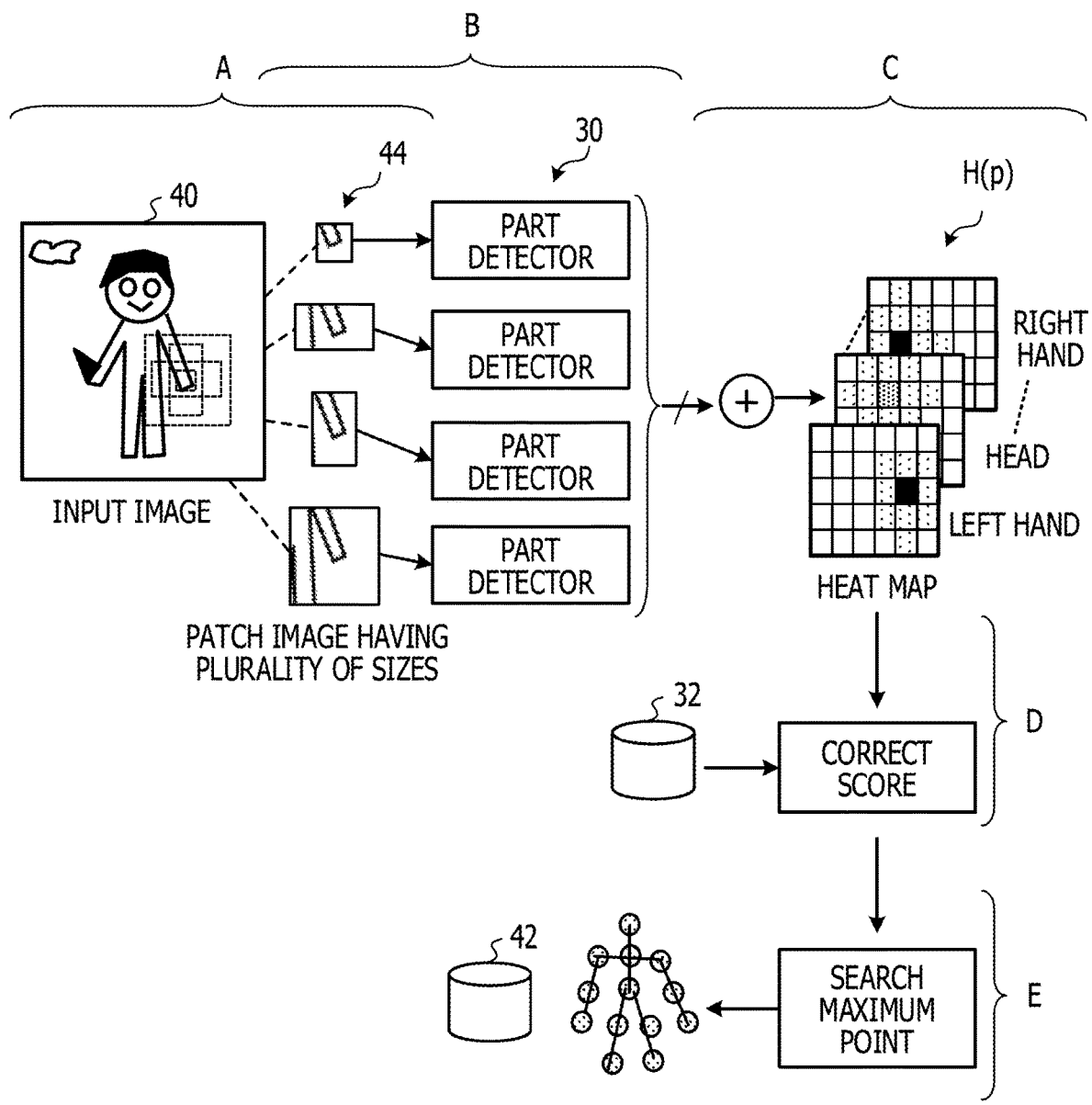
FIG. 2 illustrates one example of processing by the part recognition apparatus.

For example, the cut-out unit 12 is able to cut out, as illustrated in A in FIG. 2, centering on each pixel in the input image 40, for example, regions of respective sizes of 32×32 pixels, 64×32 pixels, 32×64 pixels, and 64×64 pixels, as the respective patch images 44. Note that, the abovementioned sizes are merely examples and are not limited to these, and the number of types of the size is not limited to four types, but may be two or three types or may be five types or more.

Figure 3:
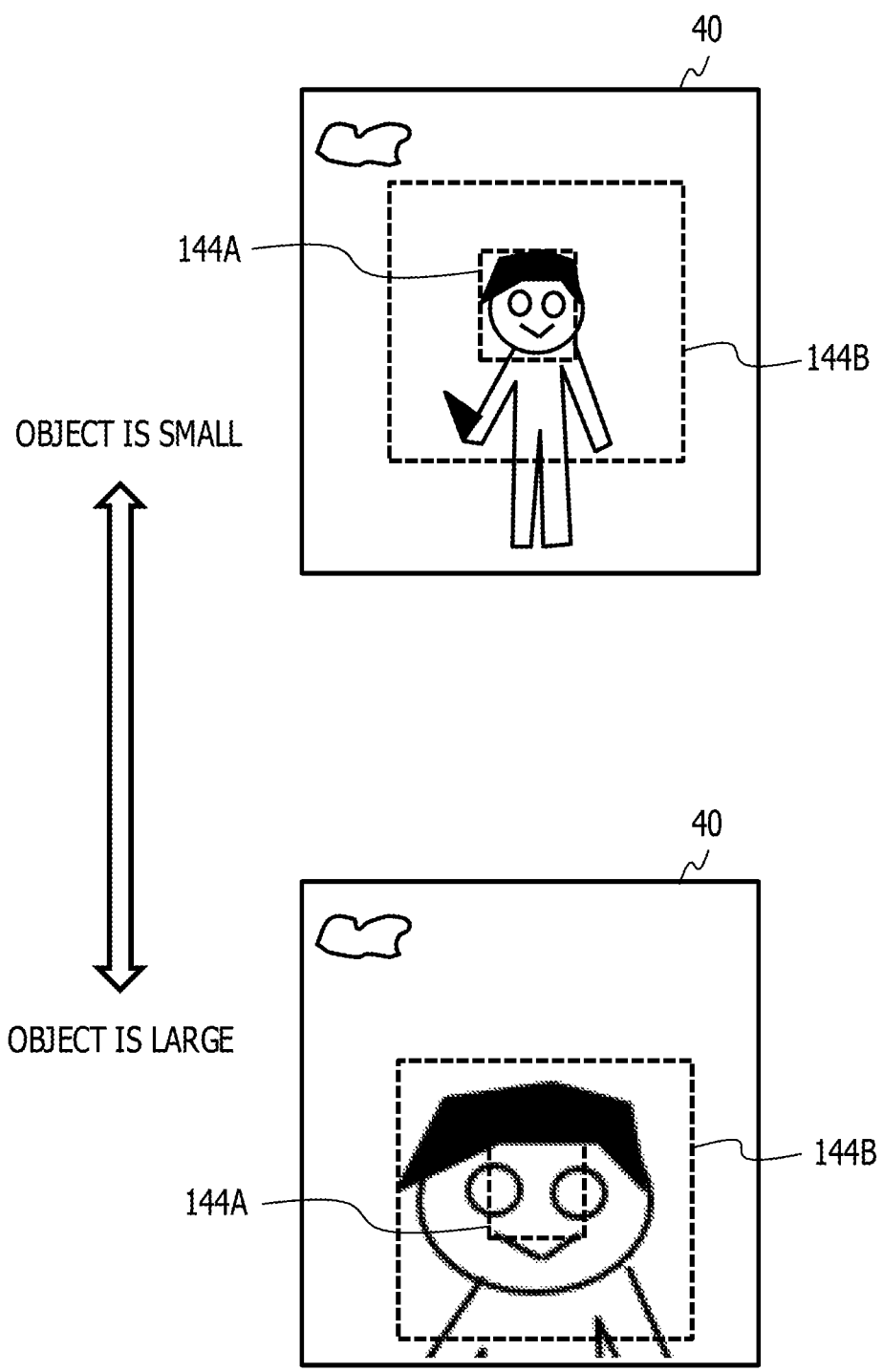
FIG. 3 illustrates one example of cut-out of a plurality of patch images.

The reason why the cut-out unit 12 cuts out a plurality of patch images having different sizes is described. When the extent of the size that a person as an object is imaged in the input image 40 is indefinite, problems as the following occur. For example, as illustrated in FIG. 3, as a patch image having a size of a fixed one type, considered are a case where a patch image 144A having a comparatively small size relative to the input image 40 is cut out, and a case where a patch image 144B having a comparatively large size is cut out. Note that, the examples of FIG. 3 illustrate the cases where a recognition target part is the head of a person.

When the ratio of the region indicating an object in the input image 40 is low, for example, when an object within the input image 40 is small, as illustrated in an upper view in FIG. 3, a suitable region containing a head is able to be cut out with the patch image 144A having a small size. In contrast, with the patch image 144B having a large size, a region including many parts of the body other than the head and the background is cut out. In this case, an influence by the parts other than the head and the background included in the patch image 144B increases the possibility that the part indicated by the patch image 144B is not recognized as a head.

In contrast, when the ratio of the region indicating an object in the input image 40 is high, for example, when an object within the input image 40 is large, as illustrated in a lower view in FIG. 3, a suitable region containing a head is able to be cut out with the patch image 144B having a large size. However, with the patch image 144A having a small size, only a region of a portion of the head is able to be cut out. In this case, the lack of information for recognizing that the patch image 144A includes the head increase the possibility that the part indicated by the patch image 144A is not recognized as a head.

To solve this, for example, it is considered to maintain the size of a person by adding a process to recognize a region where the person is present within the input image 40 and normalize the size of the region where the person is present. However, for example, it is possible to recognize a region where a person is present with good accuracy when the person directs the front, however, it is difficult to recognize a region where a person is present with good accuracy when the person directs in the transverse direction or when a portion of the body is hidden by an obstacle.

The cut-out unit 12 cuts out the plurality of patch images 44 having different sizes independent of the size of an object in the input image 40, in order to allow a region appropriately containing a part as a recognition target that is included in the object to be cut out as a patch image.

The creation unit 14 inputs each of the plurality of patch images 44 that are cut out by the cut-out unit 12, as illustrated in B in FIG. 2, into the part detector 30 corresponded to the size of each patch image 44. In other words, the patch image 44 having a size k is inputted into the part detector 30 that allows an image having the size k to be inputted and processed.

Figure 4:
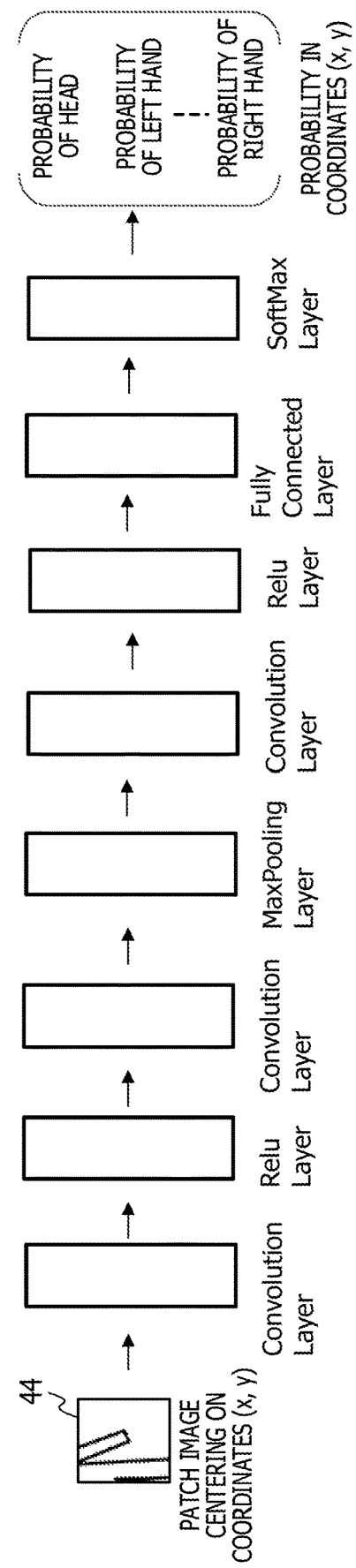
FIG. 4 illustrates one example of a part detector.

The part detector 30 outputs a probability that the inputted patch image 44 is an image indicating the part set in advance. In the present embodiment, the part detector 30 corresponded to the size k is a function that outputs a probability $P(p|(x, y, k))$ that each patch image 44 indicates a part p, as for each pixel (x, y) of the patch image 44 having the size k. Note that, x=0, 1, 2, . . . , xmax (xmax is the maximum value of an x coordinate of the patch image 44), y=0, 1, 2, . . . , ymax (ymax is the maximum value of a y coordinate of the patch image 44), k=0, 1, 2, . . . , K, and p=right hand, head, . . . , left hand, are set. For example, convolution neural networks (CNN) as illustrated in FIG. 4 are applicable as the part detector 30.

The creation unit 14 uses input of each of the plurality of patch images 44 that are cut out centering on the pixel (x, y) of the input image 40 to calculate a score in which respectively probabilities are integrated for each part, which are outputted from the respective part detectors 30 each corresponded to the size of each patch image 44. The creation unit 14 is able to calculate, for example, in a case of k=0, 1, 2, . . . , K, the sum, the maximum value, the average, and the like of each $P(p|(x, y, k))$, as a score $P(p|(x, y))$. Further, the creation unit 14 creates, as illustrated in C in FIG. 2, a heat map H(p) in which the score $P(p|(x, y))$ that is calculated relative to a pixel (x, y) of the input image 40 is stored in a pixel corresponding to each pixel position of the input image 40, for each part p. The heat map H(p) of the part p is a two-dimensional vector defined by the following expression (1).

$$H(p) = \begin{pmatrix} P(p|(0,0)) & \cdots & P(p|(x_{max},0)) \\ \vdots & \ddots & \vdots \\ P(p|(0,y_{max})) & \cdots & P(p|(x_{max},y_{max})) \end{pmatrix} \quad (1)$$

Figure 5:
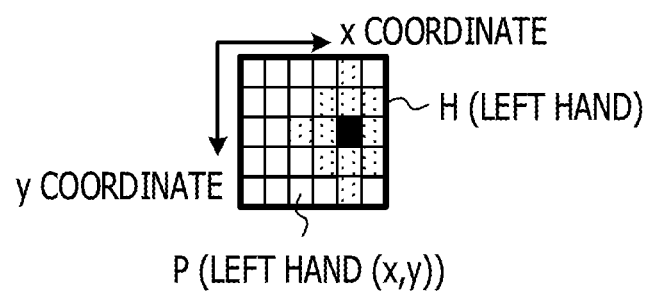
FIG. 5 illustrates examples of heat maps of respective parts.
Figure 5:
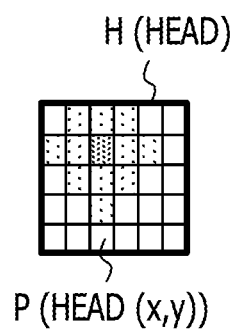
Figure 5:
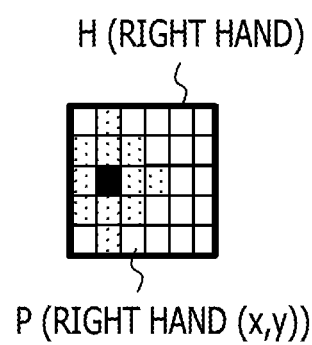

For example, the creation unit 14 creates, as illustrated in FIG. 5, heat maps H (left hand) in which P (left hand|(x, y)) is stored, H (head) in which P (head|(x, y)) is stored, . . . , and H (right hand) in which P (right hand|(x, y)) is stored, in the respective pixels (x, y). Note that, in the heat map H(p) that is schematically illustrated in each view, the higher concentration of each pixel represents the higher score being stored.

The correction unit 16 corrects the score P (p|(x, y)) of each pixel in the heat map H(p) of each part p, which is created by the creation unit 14, so as to obtain the integrity of a relative positional relationship between adjacent parts (D in FIG. 2). Hereinafter, the heat map H(p) of the part p after the score correction is referred to as a score map S(p).

Specifically, the correction unit 16 uses a probability distribution model indicating a presence probability of a part q adjacent to the part p, relative to the part p, for each relative position. The correction unit 16 corrects each score of the heat map such that as the score of a heat map H(q) of the part q at a position where a presence probability of the part q relative to the position of the part p is high is higher, the score of a score map corresponding to the position of the part p becomes higher.

Figure 6:
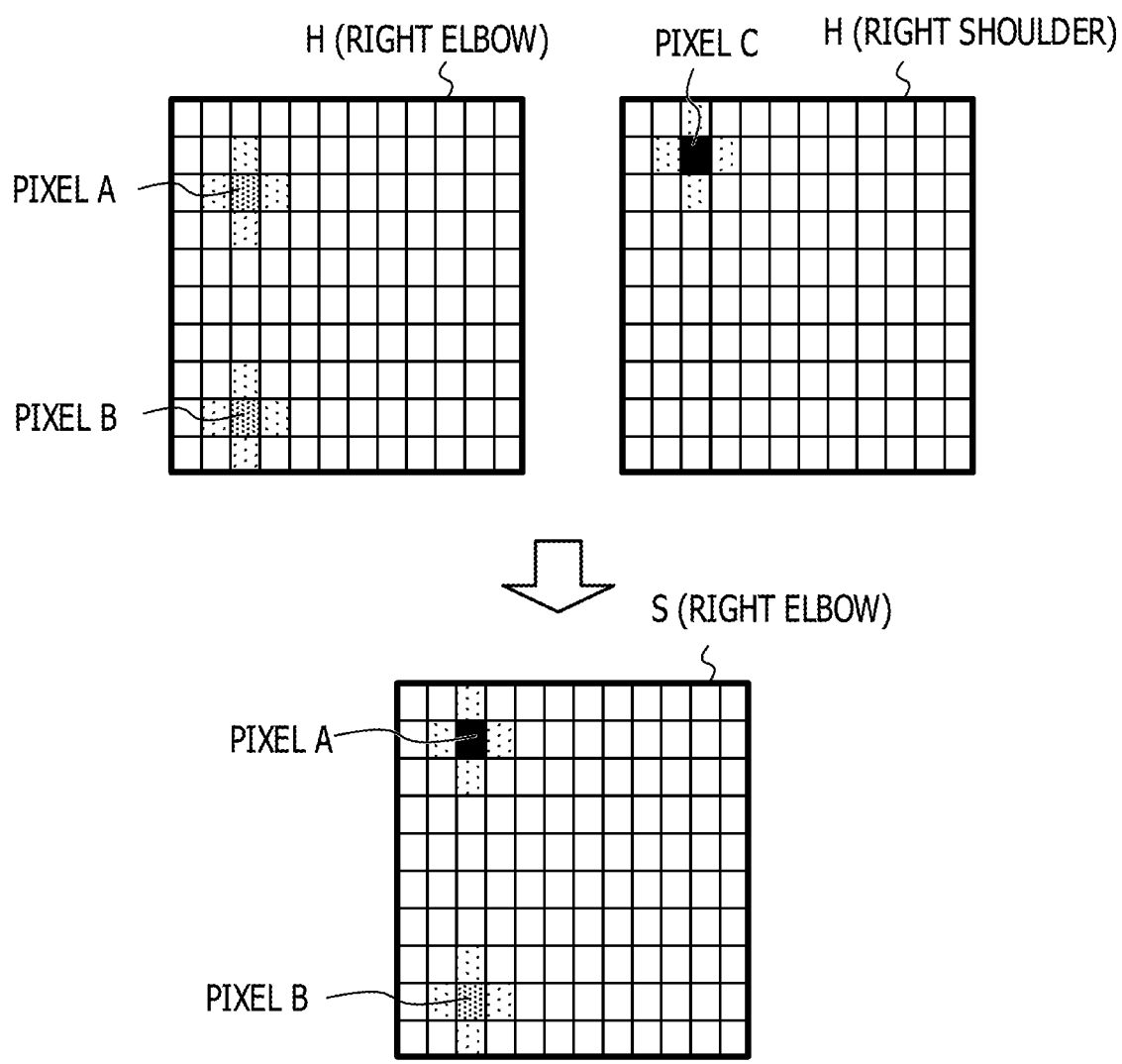
FIG. 6 illustrates one example of correction of a score based on a relative positional relationship between the parts.

For example, as illustrated in FIG. 6, in a heat map H (right elbow) of a right elbow, it is assumed that a pixel A and a pixel B the scores of which are equivalent are present at apart positions, and a plurality of candidates for position coordinates of the right elbow are present. In this time, a case where a relative distance between the parts is too apart or too close is inappropriate, so that in a heat map H (right shoulder) of a right shoulder adjacent to the right elbow, considering a relative positional relationship with a pixel C having a high score allows candidates for the position coordinates of the right elbow to be narrowed down. For example, it is assumed that when the pixel C has a high probability that the position indicates the right shoulder, based on the positional relationship with the pixel C, the position of the right elbow has a higher probability at the position of the pixel A than the position of the pixel B. In this case, as illustrated in a lower view in FIG. 6, the correction unit 16 corrects the scores such that the score of the pixel A in the heat map H(p) of the right elbow to be higher to obtain a score map S(p).

One example for implementing the correction as the above is described. The score map S(p) of the part p is defined as the following expression (2) and expression (3), for example, using Gaussian mixture distribution.

$$S(p) = \begin{pmatrix} S_p(0,0) & \cdots & S_p(x_{max},0) \\ \vdots & \ddots & \vdots \\ S_p(0,y_{max}) & \cdots & S_p(x_{max},y_{max}) \end{pmatrix} \quad (2)$$

$$S_p(x,y) = H_p(x,y) + \sum_{q \in A(p)} \max_{(z,w)} \left\{ H_q(z,w) \cdot \sum_g a_{q,g} \cdot \exp(-c_{q,g} \cdot ((x-z)^2 + (y-w)^2)) \right\} \quad (3)$$

$S_p$ (x, y) is a (x, y) component of the score map S(p), $H_p$ (x, y) is a (x, y) component of the heat map H(p) indicated in the expression (1), and A(p) is a set (for example, in a case of p=right elbow, q={right hand, right shoulder}) of the part q adjacent to the part p. $a_{q,g}$ and $C_{q,g}$ (q∈A(p)) are inter-part relative coefficients 32, are the coefficients to decide the Gaussian mixture distribution. The shape of the Gaussian mixture distribution is decided, as described above, based on the presence probability of the part q in the relative positional relationship between the part p and the part q. Note that, g is the number of Gaussian distributions included in the Gaussian mixture distribution. Moreover, among pixels of the heat map H(q), a pixel (z, w) is a pixel the score of which is reflected to the expression (3), and is a pixel included in a predetermined range that uses a pixel of a heat map H(q) corresponding to the pixel (x, y) of the heat map H(p), as the reference.

In the expression (3), the sum of a first term and a second term is obtained, however, the score of the score map S(p) may be calculated from the product or the weighted sum of the first term and the second term.

The identification unit 18 recognizes, based on the score map S(p) of each part p corrected by the correction unit 16, the part p from in the input image 40. Specifically, the identification unit 18 identifies, from the score map S(p), the position coordinates ($x_p$, $y_p$) of a pixel having the maximum score, which are indicated in the following expression (4), as position coordinates of the part p in the input image 40.

$$(x_p, y_p) = \arg\max_{x,y} S_p(x,y) \quad (4)$$

The identification unit 18 outputs the set of the position coordinates ($x_p$, $y_p$) that is identified for each part p as the recognition result 42 (E in FIG. 2).

Figure 7:
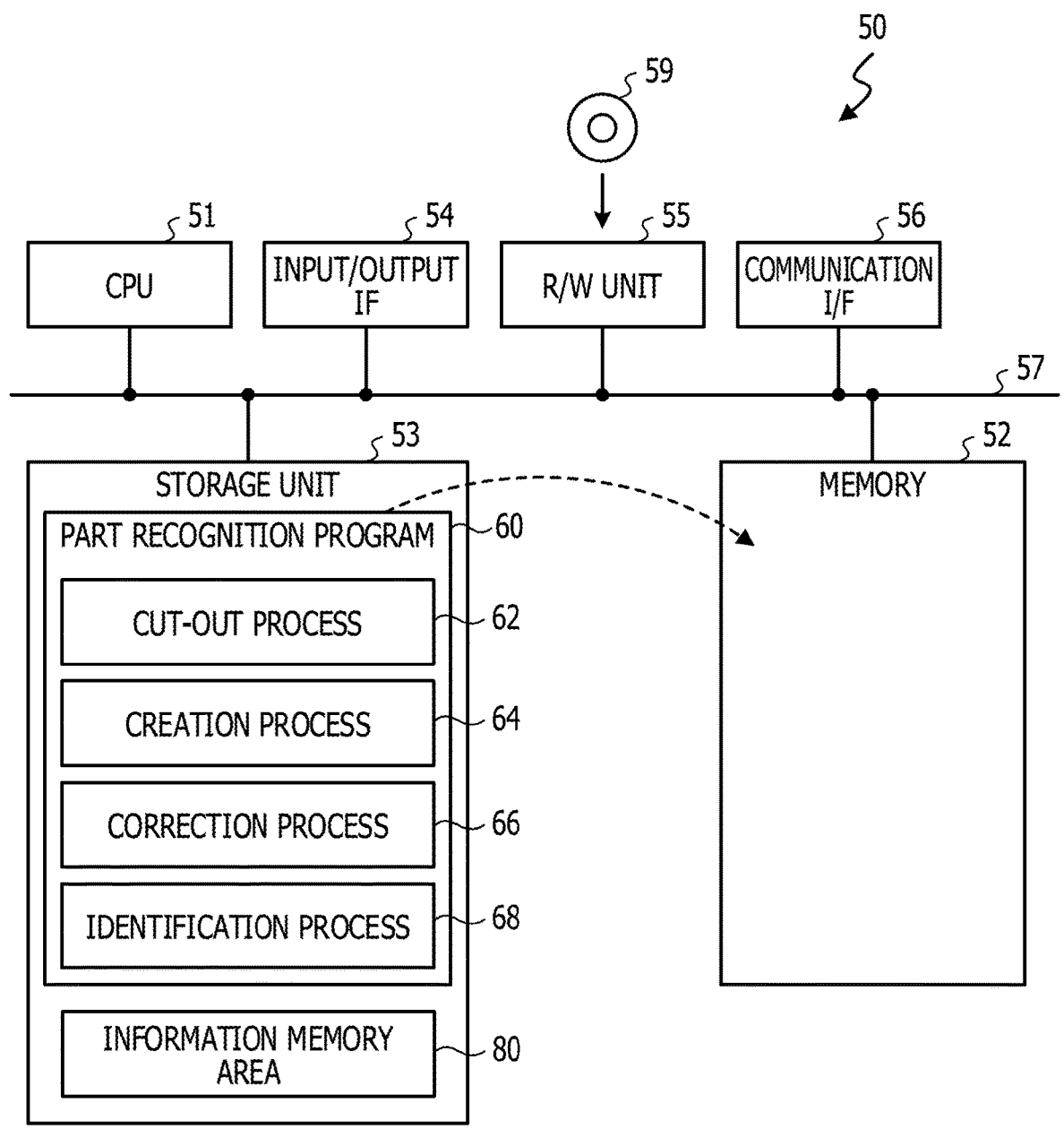
FIG. 7 illustrates one example of a computer that functions as the part recognition apparatus.

The part recognition apparatus 10 may be implemented, for example, by a computer 50 illustrated in FIG. 7. The computer 50 is provided with a central processing unit (CPU) 51, a memory 52 as a temporal memory area, and a nonvolatile storage unit 53. Moreover, the computer 50 includes an input/output interface (I/F) 54 to which input and output devices such as a display device and an output device are coupled, and a read/write (R/W) unit 55 that controls reading and writing of data from and in a storage medium 59. Moreover, the computer 50 is provided with a communication I/F 56 that is coupled to a network such as the Internet. The CPU 51, the memory 52, the storage unit 53, the input/output I/F 54, the R/W unit 55, and the communication I/F 56 are coupled to one another via a bus 57.

The storage unit 53 may be implemented by a hard disk drive (HDD), a solid state drive (SSD), a flash memory, or the like. In the storage unit 53 as a storage medium, a part recognition program 60 for causing the computer 50 to function as the part recognition apparatus 10 is stored. The part recognition program 60 includes a cut-out process 62, a creation process 64, a correction process 66, and an identification process 68. Moreover, the storage unit 53 includes the plurality of part detectors 30 each corresponded to the patch image 44 having each size k, and an information memory area 80 in which the inter-part relative coefficient 32 is stored.

The CPU 51 reads the part recognition program 60 from the storage unit 53 and develops the part recognition program 60 in the memory 52, and successively executes the processes included in the part recognition program 60. The CPU 51 executes the cut-out process 62 to operate as the cut-out unit 12 illustrated in FIG. 1. The CPU 51 executes the creation process 64 to operate as the creation unit 14 illustrated in FIG. 1. Moreover, the CPU 51 executes the correction process 66 to operate as the correction unit 16 illustrated in FIG. 1. Moreover, the CPU 51 executes the identification process 68 to operate as the identification unit 18 illustrated in FIG. 1. Moreover, the CPU 51 reads the plurality of part detectors 30 and the inter-part relative coefficient 32 from the information memory area 80, and develops those in the memory 52. With this, the computer 50 having executed the part recognition program 60 functions as the part recognition apparatus 10. The CPU 51 that executes the programs is a hardware.

Figure 8:
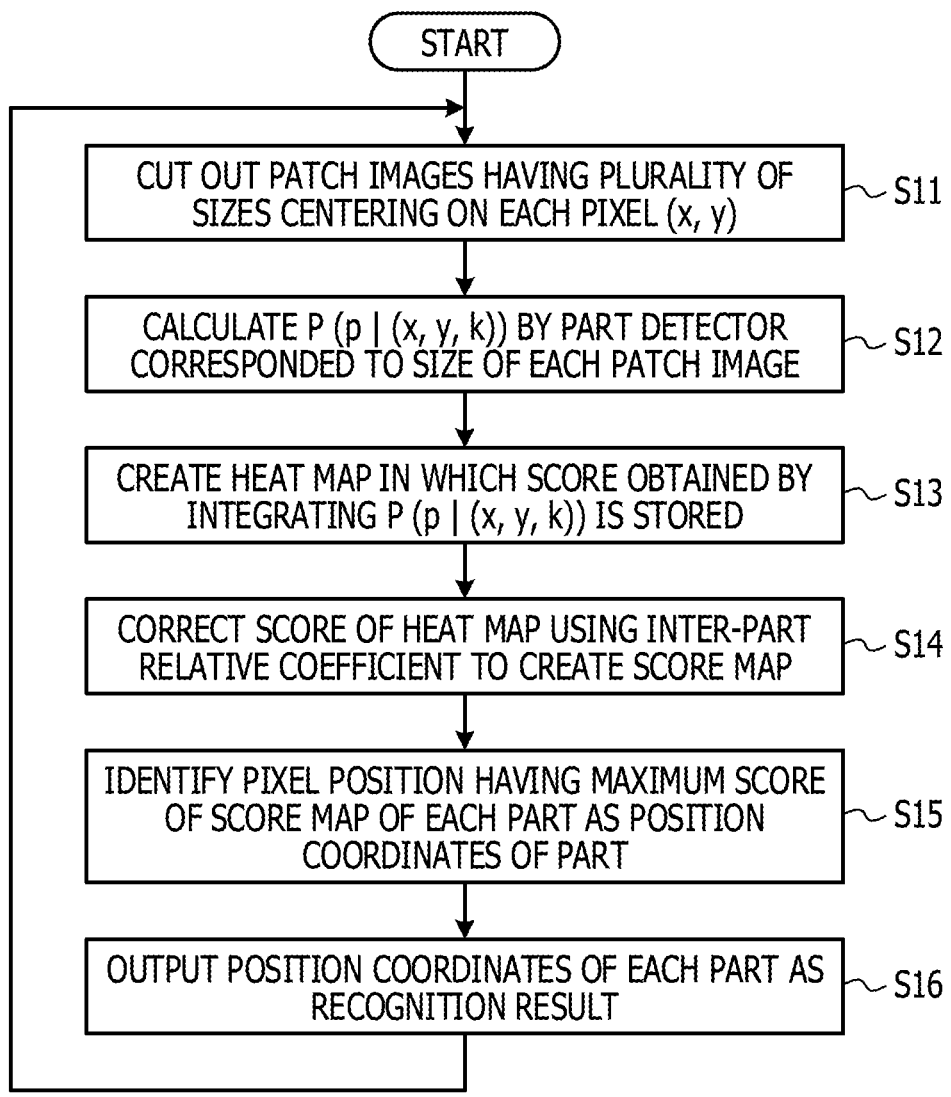
FIG. 8 illustrates one example of part recognition processing.

When the input image 40 is inputted into the part recognition apparatus 10, the part recognition apparatus 10 executes part recognition processing illustrated in FIG. 8. Note that, the part recognition processing is one example of the part recognition method in the techniques of this disclosure.

At step S11 in the part recognition processing illustrated in FIG. 8, the cut-out unit 12 cuts out regions each having a size k (k=0, 1, 2, . . . , K) centering on each pixel (x, y) of the input image 40, as patch images 44.

At step S12, the creation unit 14 inputs each patch image 44 having a size k into the part detector 30 corresponded to the size k. The creation unit 14 obtains, as the output from the part detector 30 corresponded to the size k, as for each pixel (x, y) of the patch image 44 having the size k, a probability P (p|(x, y, k)) that the patch image 44 is an image indicating the part p.

At step S13, the creation unit 14 calculates a score P (p|(x, y)) in which the respective probabilities P (p|(x, y, k)) that are outputted from the part detectors 30 corresponded to the sizes k are integrated for each part p. As illustrated in the expression (1), the creation unit 14 creates a heat map H(p) in which the score P (p|(x, y)) that is calculated relative to a pixel (x, y) of the input image 40 is stored in a pixel corresponding to each pixel position of the input image 40, for each part p.

At step S14, the correction unit 16 corrects the score P (p|(x, y)) in each pixel of the heat map H(p) of each part p, for example, in accordance with the expression (3) so as to obtain the integrity of a relative positional relationship between the adjacent parts, and creates a score map S(p) as indicated by the expression (2). Note that, the process of this step may be repeated a predetermined times by using the component $S_p$ (x, y) of the created score map S(p) as $H_p$ (x, y) in the expression (3). This corrects the score with better accuracy.

At step S15, the identification unit 18 identifies, from the score map S(p) of each part p, position coordinates $(x_p, y_p)$ of a pixel having the maximum score indicated in the expression (4) as position coordinates of the part p in the input image 40.

At step S16, the identification unit 18 outputs the set of the position coordinates $(x_p, y_p)$ that is identified for each part p as the recognition result 42. The processing then return to the step S11.

Position coordinates of each part may be identified from the score map, or position coordinates of each part may be identified from the heat map without the score map being created.

As described in the foregoing, the part recognition apparatus 10 cuts out patch images having a plurality of sizes from an input image. This increases the possibility that the part recognition apparatus 10 may cut out a patch image appropriately containing the part without depending on the size of each part in the input image. The part recognition apparatus 10 inputs each patch image into a part detector corresponded to each size, and calculates a probability that each patch image is an image indicating each part. The part recognition apparatus 10 uses a score of each pixel in which probabilities calculated by the respective part detectors are integrated to recognize the part in the input image. This allows the part recognition accuracy to be improved.

The part recognition apparatus 10 corrects the score corresponding to each pixel based on the relative positional relationship between the parts, and identifies position coordinates of each part based on the corrected score. This allows the part recognition accuracy to be further improved.

Figure 9:
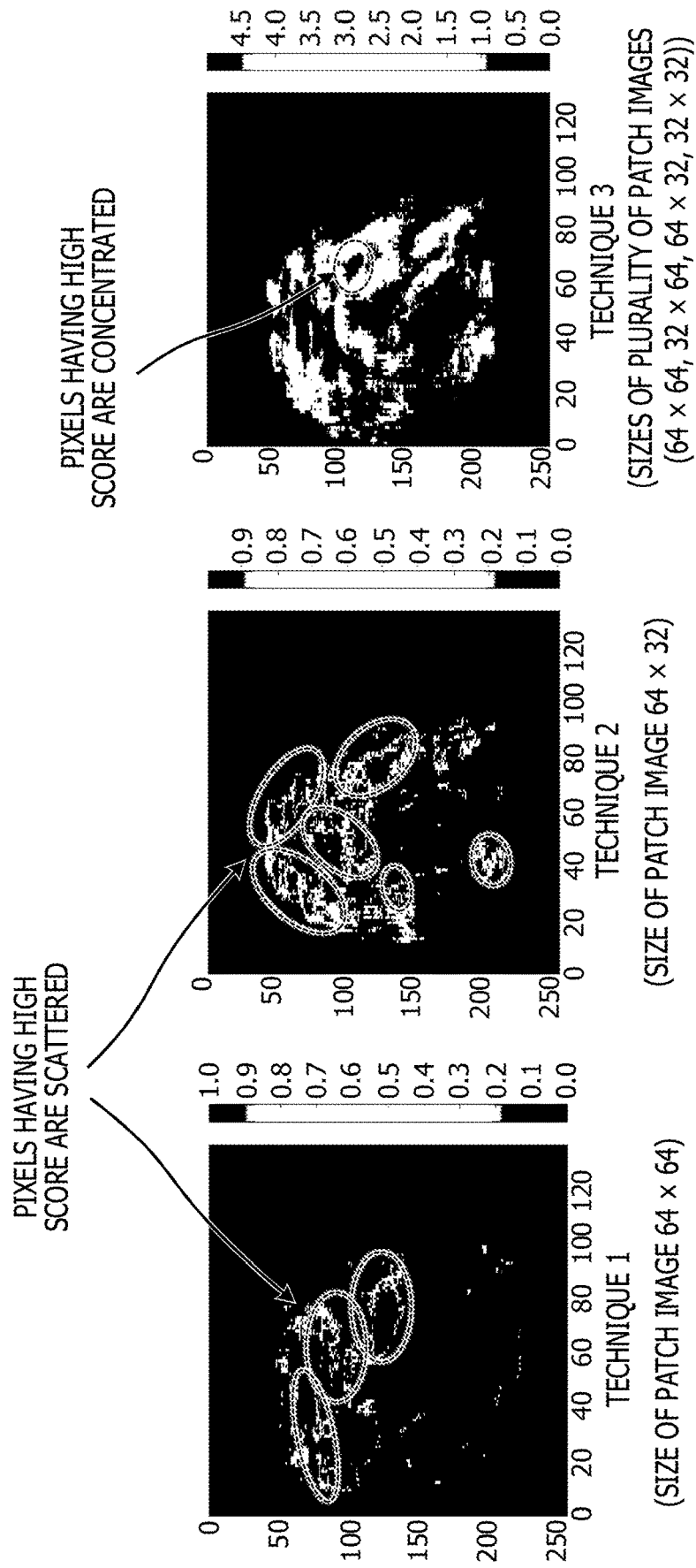
FIG. 9 illustrates examples of heat maps.

FIG. 9 illustrates examples of heat maps that are created respectively using a technique 1, a technique 2, and a technique 3, as for a heat map including a left hand as a target part. The technique 1 is a technique of creating a heat map with a single patch image of 64×64 pixels, and the technique 2 is a technique of creating a heat map with a single patch image of 64×32. As for the technique 3, a case where a heat map is created with four patch images 64×64 pixels, 32×64 pixels, 64×32 pixels, and 32×32 pixels is employed. As illustrated in FIG. 9, it is understood that, compared with the cases of the technique 1 and the technique 2, the heat map created by the technique 3 has regions of pixels having high score are more concentrated to allow position coordinates of the left hand to be identified with good accuracy.

Figure 10:
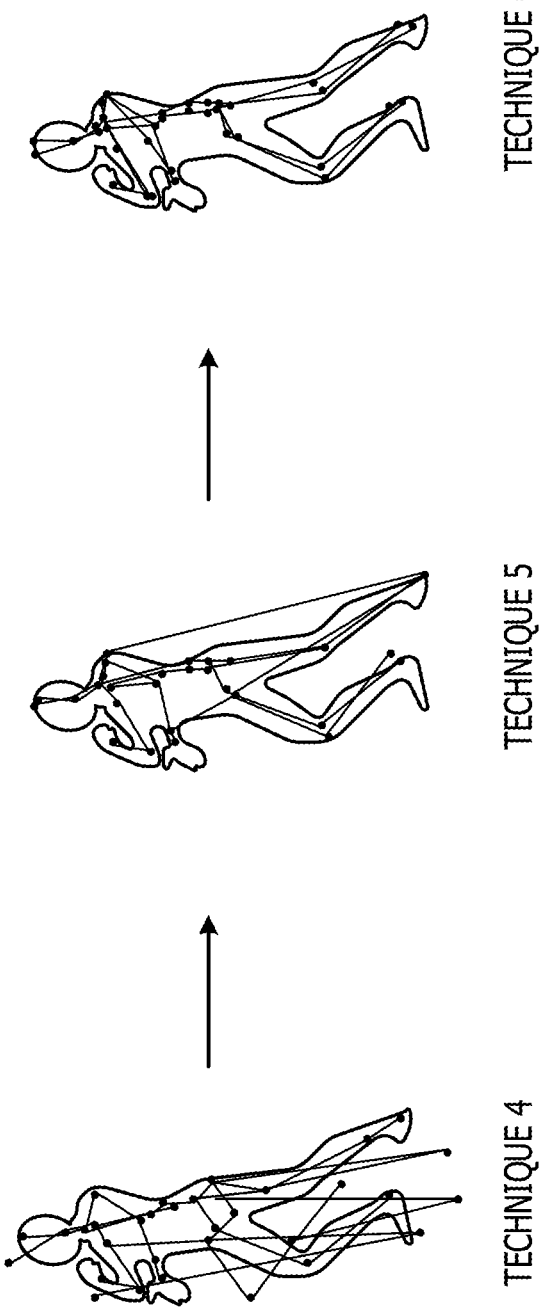
FIG. 10 illustrates examples in which position coordinates for each identified part are connected between the adjacent parts and associated with a human body image to make a picture.

FIG. 10 illustrates examples each of which is position coordinates for each part identified by each of a technique 4, a technique 5, and a technique 6 being coupled between the adjacent parts and imaged in association with a human body image. The technique 4 is a technique of identifying position coordinates of each part based on a heat map created from a single patch image. The technique 5 is a technique of identifying position coordinates of each part based on a heat map created from patch images having a plurality of sizes. The technique 6 is a technique of identifying position coordinates of each part based on a score map in which a heat map created from patch images having a plurality of sizes is corrected based on a relative positional relationship between the parts. As illustrated in FIG. 10, it is understood that position coordinates of each part is identified with the accuracy by the technique 5 better than by the technique 4, moreover, with the accuracy by the technique 6 better than by the technique 5.

Figure 11:
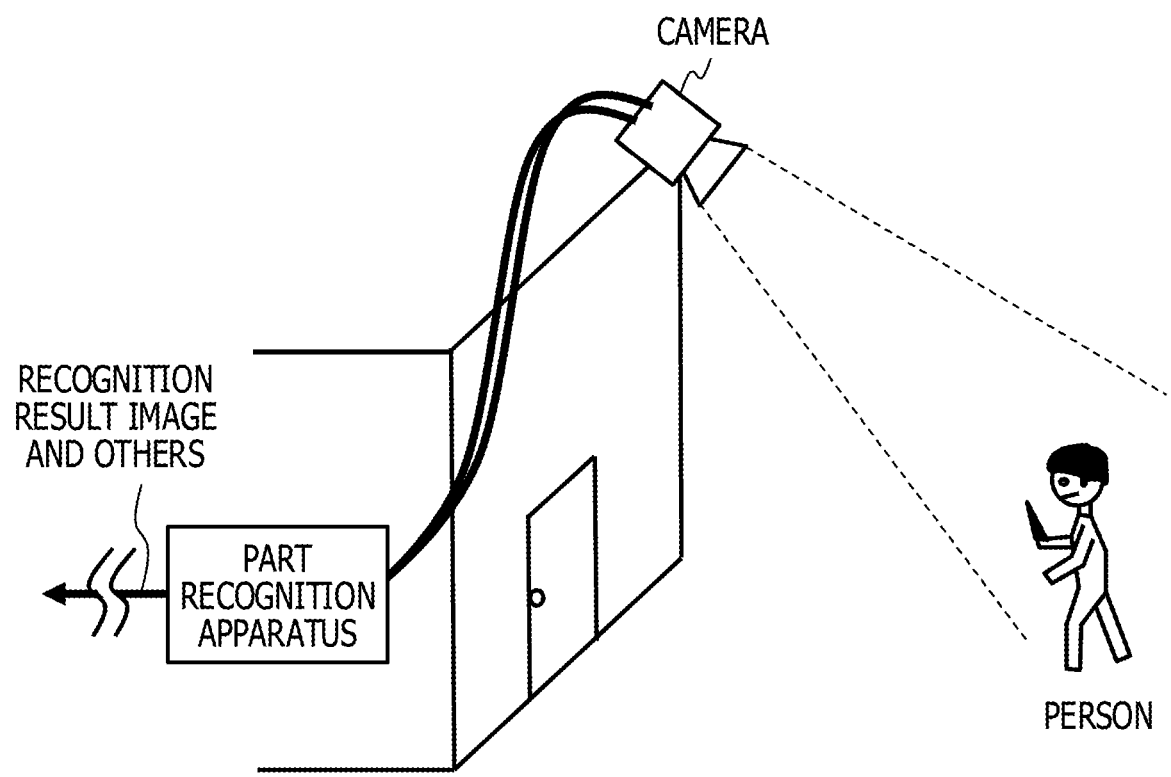
FIG. 11 illustrates one example of a scene in which an imaging control system is applied.

For example, as illustrated in FIG. 11, an imaging control system applicable to a camera system that images a suspicious person who breaks into a car parking space or premises is described.

Figure 12:
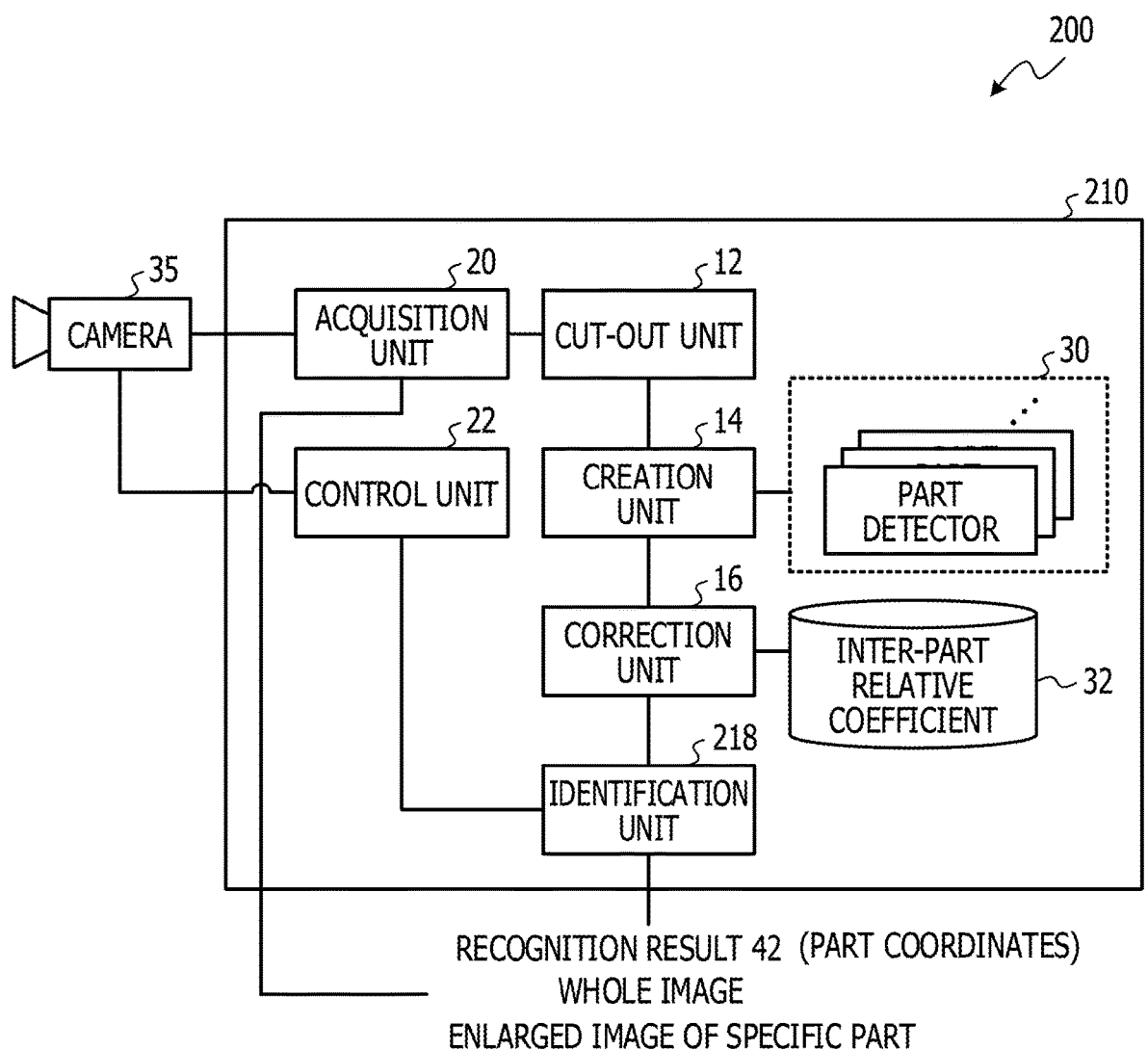
FIG. 12 illustrates one example of the imaging control system.

As illustrated in FIG. 12, an imaging control system 200 includes a camera 35 and a part recognition apparatus 210. The part recognition apparatus 210 includes, as function units, an acquisition unit 20 and a control unit 22, and includes an identification unit 218 instead of the identification unit 18, which is different from the part recognition apparatus 10.

The acquisition unit 20 acquires each frame image of moving image data that is imaged and outputted by the camera 35. When the acquisition unit 20 acquires a frame image of moving image data that is imaged in a state where the magnification of the camera 35 is set to an initial value, the acquisition unit 20 transfers the acquired frame image as the input image 40 (whole image) to the cut-out unit 12. Moreover, when the acquisition unit 20 acquires a frame image of moving image data that is imaged in a state where the magnification of the camera 35 is set to an enlarged magnification (a detail is described later), the acquisition unit 20 outputs the frame image in association with a recognition result outputted from the identification unit 218, with the whole image.

The identification unit 218 determines, out of a plurality of parts p for which score maps S(p) are created by the correction unit 16, whether the maximum score of a score map S(p') relative to a specific part p' is a predetermined threshold or more. If the maximum score is the predetermined threshold or more, the identification unit 218 identifies position coordinates ($x_{p'}$, $y_{p'}$) of a pixel in which the maximum score is stored as position coordinates of the specific part p'. The identification unit 218 outputs the position coordinates ($x_{p'}$, $y_{p'}$) of the identified specific part p' as a recognition result 242, and notifies the control unit 22 of the position coordinates ($x_{p'}$, $y_{p'}$) of the identified specific part p'. Note that, the recognition result 242 may include not only the position coordinates ($x_{p'}$, $y_{p'}$) of the specific part p', but also position coordinates of another part p ($x_p$, $y_p$).

The control unit 22 controls the magnification and the angle of the camera 35, based on the position coordinates ($x_{p'}$, $y_{p'}$) notified from the identification unit 218 and information held in advance on the number of pixels and the installed position of the camera 35, such that the specific part p' falls within the entire field angle of the camera 35. Specifically, the control unit 22 calculates, by centering on the notified position coordinates ($x_{p'}$, $y_{p'}$), the magnification in which a region set in advance as a range indicating the specific part p' is the field angle of the camera 35, and angles (a pan angle and a tilt angle) of the camera 35 that implements the imaging direction. The control unit 22 sets the calculated magnification and angle to the camera 35. This drives a driving unit of the camera 35 so as to have the set magnification and angle, and an enlarged image of the specific part p' is imaged by the camera 35.

The specific part p' is decided in advance in accordance with the usage purpose of the imaging control system 200. For example, when the imaging control system 200 is applied to a camera system for crime prevention measures, images of a face of a suspicious person or a hand thereof by which a weapon is likely to be held are important, so that the head or the hand may be decided as the specific part p'.

Figure 13:
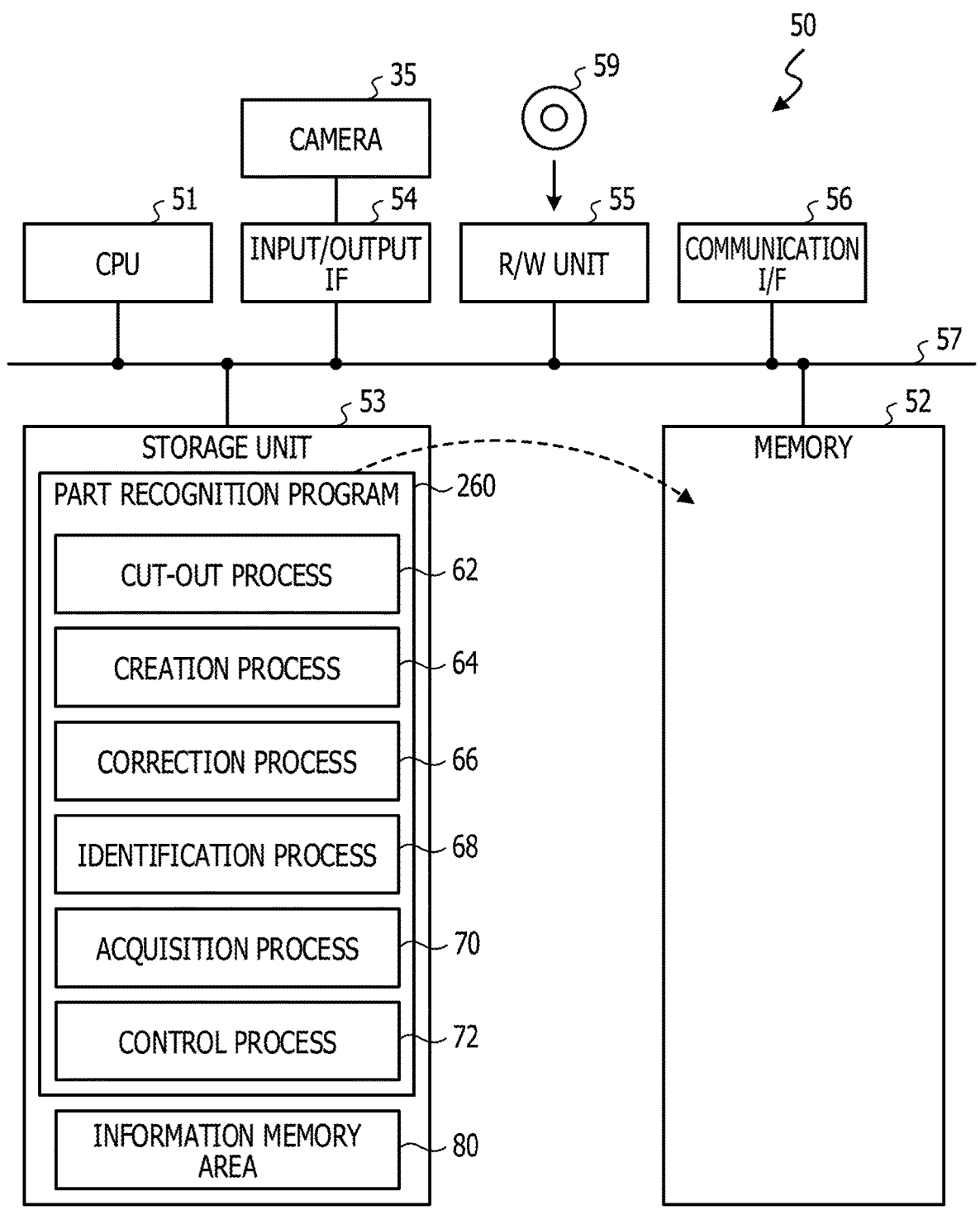
FIG. 13 illustrates one example of a computer that functions as the part recognition apparatus.

The part recognition apparatus 210 may be implemented by the computer 50. For example as illustrated in FIG. 13, the camera 35 is coupled to an input-output I/F 54 of the computer 50. The computer 50 is coupled via the communication I/F 56, for example, to an external device installed in a security company and the like.

In the storage unit 53 as a storage medium, a part recognition program 260 for causing the computer 50 to function as the part recognition apparatus 210 is stored. The part recognition program 260 includes the cut-out process 62, the creation process 64, the correction process 66, an identification process 268, an acquisition process 70, and a control process 72.

The CPU 51 reads the part recognition program 260 from the storage unit 53 and develops the part recognition program 260 in the memory 52, and successively executes the processes included in the part recognition program 60. The CPU 51 executes the identification process 268 to operate as the identification unit 218 illustrated in FIG. 12. Moreover, the CPU 51 executes the acquisition process 70 to operate as the acquisition unit 20 illustrated in FIG. 12. Moreover, the CPU 51 executes the control process 72 to operate as the control unit 22 illustrated in FIG. 12. The other processes are similar to those in the part recognition program 60. With this, the computer 50 having executed the part recognition program 260 functions as the part recognition apparatus 210.

Figure 14:
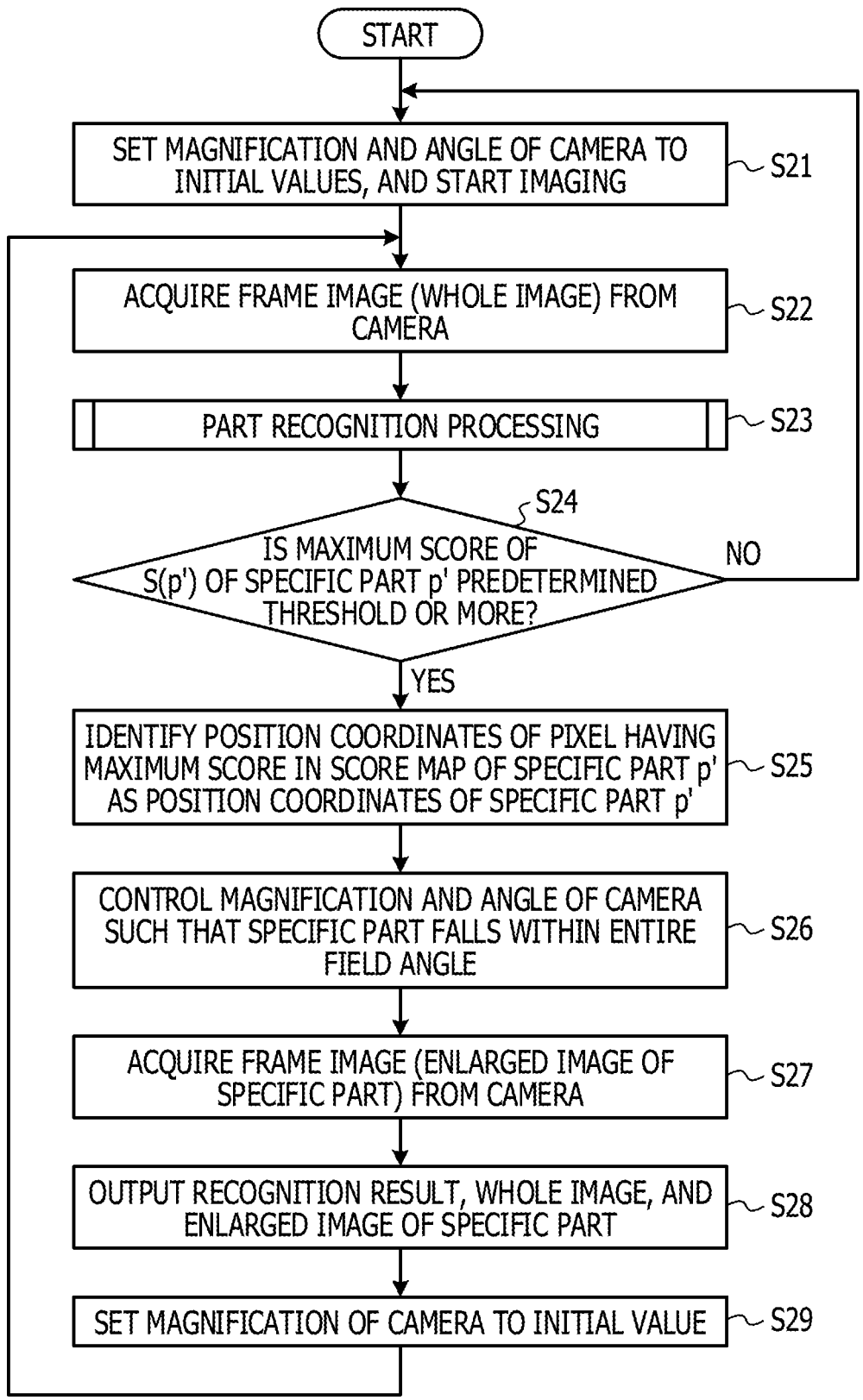
FIG. 14 illustrates one example of imaging control processing.

When a start of the imaging control system 200 is instructed, the part recognition apparatus 210 executes imaging control processing illustrated in FIG. 14. The imaging control processing is one example of the part recognition processing in the techniques of this disclosure.

At step S21, the control unit 22 sets the magnification and the angle of the camera 35 to initial values, and instruct the camera 35 to start imaging. This causes the camera 35 to start imaging with the set magnification and angle, and output moving image data.

At step S22, the acquisition unit 20 acquires one frame image of the moving image data outputted from the camera 35, and transfers the frame image as the input image 40 (whole image) to the cut-out unit 12.

At step S23, the part recognition processing is executed. The part recognition processing may be similar to the steps S11 to S14 in the part recognition processing illustrated in FIG. 8.

At step S24, the identification unit 218 determines, out of a plurality of parts p for which score maps S(p) are created by the correction unit 16, whether the maximum score of a score map S(p') relative to a specific part p' is a predetermined threshold or more. If the maximum score is the threshold or more, the processing is shifted to the step S25, whereas if being less than the threshold, the process returns to the step S21.

At step S25, the identification unit 218 identifies position coordinates ($x_{p'}$, $y_{p'}$) of a pixel in which the maximum score is stored in the score map S(p') as position coordinates of the specific part p'. The identification unit 218 notifies the control unit 22 of the identified position coordinates ($x_{p'}$, $y_{p'}$) of the specific part p'.

At step S26, the control unit 22 calculates, by centering on the position coordinates ($x_{p'}$, $y_{p'}$) notified from the identification unit 218, a magnification and an angle such that a region in accordance with the specific part p' is the field angle of the camera 35, and sets the calculated magnification and angle to the camera 35. This drives the driving unit of the camera 35 so as to have the set magnification and angle, and an enlarged image of the specific part p' is imaged and outputted by the camera 35.

At step S27, the acquisition unit 20 acquires the enlarged image of the specific part p' outputted from the camera 35.

At step S28, the identification unit 218 outputs the position coordinates ($x_{p'}$, $y_{p'}$) of the specific part p' identified at the abovementioned step S25 as the recognition result 242. The acquisition unit 20 outputs the whole image acquired at the abovementioned step S22 and the enlarged image of the specific part p' acquired at the abovementioned step S27, which are associated with the recognition result 242 outputted from the identification unit 218.

At step S29, the control unit 22 resets the magnification of the camera 35 to the initial value, and the processing returns to step S22. Here, the angle of the camera 35 remains to the angle set at the abovementioned step S25. This causes the same object including the specific part p' that has been recognized in the previous frame image is highly likely to be detected also in the next frame image, which allows tracking of the object. Note that, the tracking process of an object is not limited to the abovementioned example, but the conventionally well known techniques such as a technique in which feature points are associated between frame images are applicable.

Figure 15:
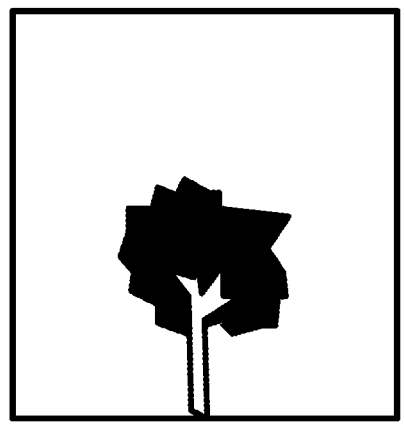
FIG. 15 illustrates one example of an input image that is likely to be erroneously recognized.
Figure 16:
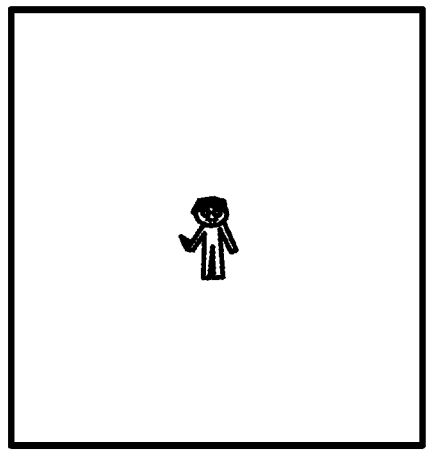
FIG. 16 illustrates one example of a case where an object is small in the whole image.

As described in the foregoing, with the imaging control system 200 illustrated in FIG. 12, it is possible to recognize each part of an object with good accuracy by the part recognition processing similar to that from FIGS. 1 to 11. For example, it is possible to suppress a part of a matter that is different from an object as illustrated in FIG. 15 from being erroneously recognized as a part of the object. The imaging control system 200 controls the magnification and the angle of the camera such that a specific part, out of parts that are recognized with good accuracy, is enlarged and imaged. Accordingly, for example, as illustrated in FIG. 16, even when an object is small within the whole image, it is possible to output an image with high resolution, as an enlarged image of a specific part. This allows an image with high resolution to be used, for example, in a case where an enlarged image of a target part that is outputted from the part recognition apparatus is visually monitored, a case where a suspicious person or the like is identified through an analysis of the image, and other cases.

The part as a recognition target may be each part of a human body, or may be not limited to this.

The part recognition programs 60, 260 may be stored (installed) in advance in the storage unit 53. The program related to the disclosed technique may be provided in a form of being stored in a storage medium such as a CD-ROM, a DVD-ROM, or a USB memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A part recognition method comprising:
cutting, by a computer, out a plurality of partial images having different sizes using each of positions of an input image as a reference;
calculating a probability that each of the partial images is an image indicating a part;
calculating, for each of the positions, a score by integrating the probability for each of the partial images;
recognizing, based on the score for each of the positions, the part from the input image;
creating, for each of the positions, a heat map in which the score is stored in a pixel corresponding to the respective positions;
identifying, in the recognizing, a coordinate of a pixel having a maximum score in the heat map as a position coordinate of the part; and
correcting the score for each of the positions in the heat map based on a relative positional relationship between the adjacent positions.

2. The part recognition method according to claim 1, wherein the correcting is performed by using a probability distribution model indicating a presence probability of one of the adjacent positions relative to the other of the adjacent positions in such a manner that a score corresponding to a position in which the presence probability is higher and in the heat map corresponding to the one of the adjacent positions is higher, a score in the heat map corresponding to the other of the adjacent positions is higher.

3. An information processing apparatus comprising:
a memory; and
a processor coupled to the memory, the processor:
cuts out a plurality of partial images having different sizes using each of positions of an input image as a reference;
calculates a probability that each of the partial images is an image indicating a part;
calculates, for each of the positions, a score by integrating the probability for each of the partial images;
recognizes, based on the score for each of the positions, the part from the input image;
creates, for each of the positions, a heat map in which the score is stored in a pixel corresponding to the respective positions;
identifies, in a recognition, a coordinate of a pixel having a maximum score in the heat map as a position coordinate of the part; and
corrects the score for each of the positions in the heat map based on a relative positional relationship between the adjacent positions.

4. The information processing apparatus according to claim 3, wherein the processor performs a correction of the score by using a probability distribution model indicating a presence probability of one of the adjacent positions relative to the other of the adjacent positions in such a manner that a score corresponding to a position in which the presence probability is higher and in the heat map corresponding to the one of the adjacent positions is higher, a score in the heat map corresponding to the other of the adjacent positions is higher.

5. An imaging control system comprising:
an image pickup device in which a magnification and an imaging direction are changeable;
a processor coupled to the image pickup device, the processor:
cuts out a plurality of partial images having different sizes using each of positions of an input image as a reference;
calculates a probability that each of the partial images is an image indicating a specific part;
calculates, for each of the positions, a score by integrating the probability for each of the partial images;
recognizes, based on the score for each of the positions, the specific part from the input image;
creates, for each of the positions, a heat map in which the score is stored in a pixel corresponding to the respective positions; and identifies, in a recognition, a coordinate of a pixel having a maximum score in the heat map as a position coordinate of the part; and
corrects the score for each of the positions in the heat map based on a relative positional relationship between the adjacent positions.

6. The imaging control system according to claim 5, wherein the processor controls at least one of the magnification and the imaging direction in such a manner that a ratio of a region including a specific part of the recognized part to the input image becomes a threshold value or more.

7. The imaging control system according to claim 5, wherein the processor performs a correction of the score by using a probability distribution model indicating a presence probability of one of the adjacent positions relative to the other of the adjacent positions in such a manner that a score corresponding to a position in which the presence probability is higher and in the heat map corresponding to the one of the adjacent positions is higher, a score in the heat map corresponding to the other of the adjacent positions is higher.

* * * * *